UNITED STATES PATENT OFFICE.

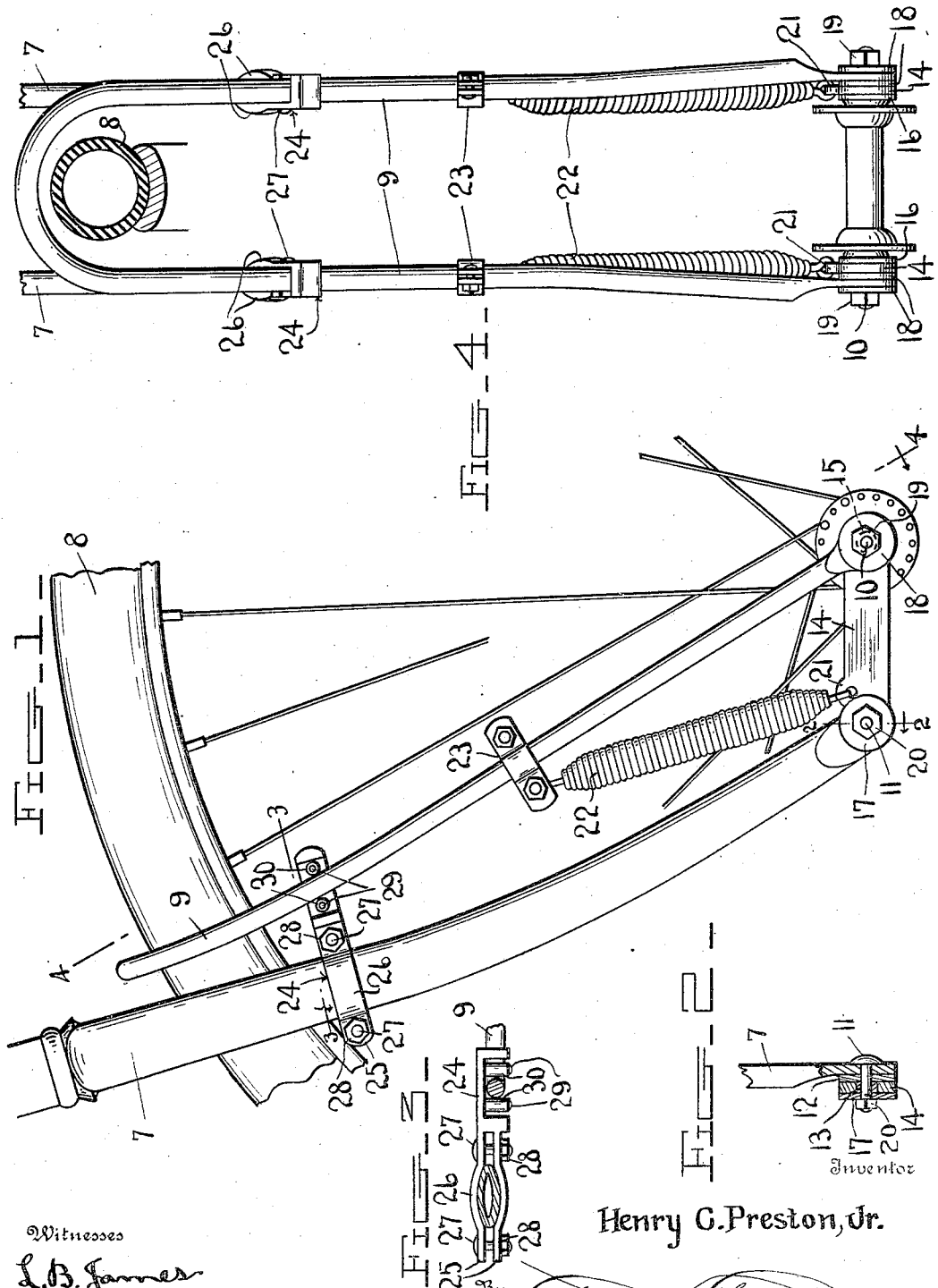

HENRY C. PRESTON, JR., OF FALLSTON, MARYLAND.

SPRING-FORK FOR BICYCLES.

934,013.  Specification of Letters Patent.  Patented Sept. 14, 1909.

Application filed January 11, 1909.  Serial No. 471,632.

*To all whom it may concern:*

Be it known that I, HENRY C. PRESTON, Jr., a citizen of the United States, residing at Fallston, in the county of Harford, State of Maryland, have invented certain new and useful Improvements in Spring-Forks for Bicycles; and I do hereby declare the following to be a full, clear, and exact description of the invention, such as will enable others skilled in the art to which it appertains to make and use the same.

The present invention has reference to bicycles, and it resides primarily in the production of an improved spring fork arranged to straddle the steering wheel and connected with the main fork, for absorbing the jar incidental to the passage of the wheel over rough roads.

Briefly described, the invention comprises a supplemental fork arranged to straddle the steering wheel, as above stated, and having the terminals of its branches pivotally connected with the front ends of a pair of rocking levers whose rear ends are pivoted to the terminals of the branches of the main fork, said levers being connected by a pair of vertically-positioned retractile coil springs with a pair of clamps secured to the upper portions of the branches of the supplemental fork, the springs yielding during the passage of the wheel over obstructions in its path, and over the rough portions of the road.

The invention further resides in the provision of a specially-formed pair of clamps which connect the branches of the main and supplemental forks together in such a manner as to hold the wheel against lateral motion without affecting the steering thereof, and which also guide the supplemental frame during the vertical movements thereof incidental to the rising and falling of the wheel.

The preferred embodiment of the invention is illustrated in the accompanying drawings in which corresponding parts are designated by the same reference numerals throughout the several views.

Of the said drawings, Figure 1 is a fragmental side elevation of the front end of a bicycle provided with the improved spring fork. Figs. 2 and 3 are enlarged sectional views taken upon the lines 2—2 and 3—3 of Fig. 1, illustrative, respectively, of the manner in which the ends of the levers are connected with the terminals of the branches of the forks, and of the clamps which join together the upper portions of the branches of said forks. Fig. 4 is a section taken on the line 4—4 of Fig. 1.

Referring more particularly to the drawings, 7 designates, generally, the front fork of a bicycle, 8 the steering wheel associated therewith, and 9 a supplemental fork which straddles the wheel and has the terminals of its branches connected with the bolt 10, which serves as an axle and passes through the hollow hub of the wheel, the details of such connection being described hereinafter.

The terminal of each branch of the main fork is formed with a perforation through which is passed a horizontal bolt 11 having a washer 12 fitted thereon. Upon each of these bolts, is loosely mounted a tubular roller or sleeve 13 which is arranged to be received within a perforation formed in the rear end of a forwardly extending lever 14, said rollers forming the fulcra upon which the levers rock. The front end of each lever is provided with a similar perforation in which is received a roller 15 loosely mounted upon the adjacent end of the axle 10, there being a washer 16 interposed between the last mentioned end of each lever and the adjacent face of the hub of the wheel.

The terminals of the branches of the supplemental yoke are likewise perforated so as to receive therein the outer ends of the rollers 15, which latter have a length slightly in excess of that of the rear rollers. The levers are held against displacement from the rollers by means of washers 17—18, disposed respectively against the rear ends of the levers and the terminals of the supplemental yoke, and by nuts 19 and 20 which are threaded upon the projecting ends of the bolts 10 and 11, (the latter bolt forming the axle of the wheel, as above stated), and are arranged to be tightened against said washers 17 and 18. Each lever is formed adjacent its rear end with a perforated ear 21, to which is fastened the lower end of a retractile coil spring 22, whose upper end is fastened to a clamp 23 secured to the central portion of the adjacent branch of the supplemental yoke, the members of each clamp being bolted together as shown.

Each branch of the main fork 7 has secured thereto a clamp 24 as shown in Fig. 3. These clamps which are formed of steel have the rear portions thereof bifurcated, the fingers 25, resultant from the bifurcation, being bowed outwardly in opposite directions, intermediate their ends, as indicated by the numeral 26. The branches fit between said bowed portions, the fingers moving away from each other during the positioning of the clamps, owing to the resilience of the metal of which the same are constructed. The fingers are then clamped against the branches to the fullest possible extent, by means of nuts and bolts 28 and 27, the bolts passing through alining perforations formed in the fingers. The clamps are thus rigidly attached to the branches.

The front portion of each clamp 24 is provided with a pair of lateral pins 29, arranged axially of the clamp and in spaced relation to each other, each pin having mounted thereon a roller 30. Each pair of rollers is arranged to receive therebetween and to contact with the adjacent branch of the supplemental fork, said rollers serving to hold the latter against displacement and to guide it during the rising and falling movements relative to the main fork, such movements being incidental to the passage of the wheel over rough portions of a road or over obstructions in the road. The rollers also tend to hold the wheel against wabbling during the above described movements, and for this reason, render the steering of the machine easier.

From the foregoing, it will be apparent that the wheel is mounted yieldingly with respect to the main fork, and that the latter and the supplemental fork move in opposite directions when the wheel passes over obstructions of any sort, thus tensioning the springs 22, said springs absorbing the shocks which would otherwise affect the rider.

What is claimed is:—

1. In a bicycle, the combination of a main fork; a spring-controlled wheel-carrying mechanism pivotally connected to the main fork and including a supplemental fork; and a member rigidly secured to each branch of the main fork and loosely engaged with the adjacent branch of the supplemental fork, whereby movement of the last-named fork relative to said members is permitted, and spring connections between the supplementary and main forks located wholly without said supplementary fork.

2. In a bicycle, the combination of a main fork; a spring-controlled wheel-carrying mechanism pivotally connected to the main fork and including a supplemental fork; and a member rigidly secured to each branch of the main fork and provided with a pair of guides arranged for loose engagement with the adjacent branch of the supplemental fork, whereby movement of the last-named fork relative to said members is permitted, and spring connections between the supplementary and main forks located wholly without said supplementary fork.

3. In a bicycle, the combination of a main fork; a spring-controlled wheel-carrying mechanism pivotally connected to the main fork and including a supplemental fork; and a member rigidly secured to each branch of the main fork and provided with a pair of spaced guides between which the adjacent branch of the supplemental fork loosely passes, whereby movement of the last-named fork relative to said members is permitted, and spring connections between the supplementary and main forks located wholly without said supplementary fork.

4. In a bicycle, the combination of a main fork; a spring-controlled wheel-carrying mechanism pivotally connected to the main fork and including a supplemental fork; and a member rigidly secured to each branch of the main fork and provided with a pair of rotatable guides arranged for loose engagement with the adjacent branch of the supplemental fork, whereby movement of the last-named fork relative to said members is permitted, and spring connections between the supplementary and main forks located wholly without said supplementary fork.

5. In a bicycle, the combination of a main fork; a spring-controlled wheel-carrying mechanism pivotally connected to the main fork and including a supplemental fork; and a member rigidly secured to each branch of the main fork and provided with a pair of spaced guide rollers between which the adjacent branch of the supplemental fork loosely passes, whereby movement of the last-named fork relative to said members is permitted, and spring connections between the supplementary and main forks located wholly without said supplementary fork.

6. In a bicycle, the combination of a main fork; a spring-controlled wheel-carrying mechanism pivotally connected to the main fork and including a supplemental fork; and a member rigidly secured to each branch of the main fork and provided with a pair of horizontally mounted spaced guide rollers between which the adjacent branch of the supplemental fork loosely passes, whereby movement of the last-named fork relative to said members is permitted, and spring connections between the supplementary and main forks located wholly without said supplementary fork.

7. In a bicycle, the combination of a main fork; a spring-controlled wheel-carrying mechanism pivotally connected to the main fork and including a supplemental fork; and a clamp formed at one end with a pair of spring fingers secured to each branch of the main fork and having its other end loosely engaged with the adjacent branch of the supplemental fork, whereby movement of the last-named fork relative to said members is permitted, and spring connections between the supplementary and main forks located wholly without said supplementary fork.

8. In a bicycle, the combination of a main fork; a spring-controlled wheel-carrying mechanism pivotally connected to the main fork and including a supplemental fork; and a clamp formed at one end with a pair of spring fingers secured to each branch of the main fork and provided at its other end with a pair of spaced guides between which the adjacent branch of the supplemental fork loosely passes, whereby movement of the last-named fork relative to said members is permitted, and spring connections between the supplementary and main forks located wholly without said supplementary fork.

9. In a bicycle, the combination of a main fork; a wheel and its axle; a supplemental fork straddling the wheel and having the terminals of its branches pivotally connected with the axle; a pair of levers each having a pivotal connection at one end with the axle and at the other end with the terminal of the adjacent branch of the main axle; a member secured to each branch of the supplemental axle; and a spring connection between each member and the adjacent lever.

10. In a bicycle, the combination of a main fork; a wheel and its axle; a supplemental fork straddling the wheel and having the terminals of its branches pivotally connected with the axle; a pair of levers each having a pivotal connection at one end with the axle and at the other end with the terminal of the adjacent branch of the main axle; a member secured to each branch of the supplemental axle; a spring connection between each member and the adjacent lever; and a member rigidly secured to each branch of the main fork and loosely engaged with the adjacent branch of the supplemental fork, whereby movement of the last-named fork relative to said members is permitted.

11. In a bicycle, the combination of a main fork; a wheel and its axle; a supplemental fork straddling the wheel and having the terminals of its branches pivotally connected with the axle; a pair of levers each having a pivotal connection at one end with the axle and at the other end with the terminal of the adjacent branch of the main axle; a member secured to each branch of the supplemental axle; a spring connection between each member and the adjacent lever; and a member rigidly secured to each branch of the main fork and provided with a pair of spaced guides between which the adjacent branch of the supplemental fork loosely passes, whereby movement of the last-named fork relative to said members is permitted.

12. In a bicycle, the combination of a main fork; a wheel and its axle; a supplemental fork straddling the wheel and having the terminals of its branches pivotally connected with the axle; a pair of levers each having a pivotal connection at one end with the axle and at the other end with the terminal of the adjacent branch of the main axle; a member secured to each branch of the supplemental axle; a spring connection between each member and the adjacent lever; and a member rigidly secured to each branch of the main fork and provided with a pair of spaced guide rollers between which the adjacent branch of the supplemental fork loosely passes, whereby movement of the last-named fork relative to said members is permitted.

13. In a bicycle, the combination of a main fork having the terminals of its branches provided with horizontally mounted revoluble sleeves; a wheel and its axle; the ends of said axle being provided with sleeves; a pair of levers perforated at each end, the perforations in the rear ends of the levers receiving the first-named sleeves, and those in the front ends thereof, the second-named sleeves; a supplemental fork straddling the wheel and having the terminals of its branches perforated for the reception of said second-named sleeves; a clamp secured to each branch of the supplemental fork; and a spring connection between each clamp and the adjacent lever.

In testimony whereof, I affix my signature, in presence of two witnesses.

HENRY C. PRESTON, Jr.

Witnesses:
HENRY C. PRESTON,
HARVEY EWING.